(12) United States Patent
Bidichandani et al.

(10) Patent No.: US 8,457,088 B1
(45) Date of Patent: Jun. 4, 2013

(54) MULTI-LEVEL PICONET DATA AGGREGATION

(75) Inventors: Sameer Bidichandani, Los Gatos, CA (US); Timothy J. Donovan, Livermore, CA (US); Deepak Jain, San Ramon, CA (US); Li-Fu Jeng, San Jose, CA (US); Robert Mack, San Jose, CA (US); Neeta Srivastav, Los Gatos, CA (US); Shuangqing Yuan, Fremont, CA (US)

(73) Assignee: Marvell International Ltd. (BM)

( * ) Notice: Subject to any disclaimer, the term of this patent is extended or adjusted under 35 U.S.C. 154(b) by 507 days.

(21) Appl. No.: 12/763,446

(22) Filed: Apr. 20, 2010

Related U.S. Application Data

(60) Provisional application No. 61/171,724, filed on Apr. 22, 2009.

(51) Int. Cl.
*H04W 4/00* (2009.01)
*H04B 7/212* (2006.01)
*H04J 3/24* (2006.01)

(52) U.S. Cl.
USPC ............ 370/338; 370/347; 370/473; 370/535

(58) Field of Classification Search
None
See application file for complete search history.

(56) References Cited

U.S. PATENT DOCUMENTS

| | | | | |
|---|---|---|---|---|
| 6,885,847 B1 * | 4/2005 | Lumelsky | ..................... | 455/41.2 |
| 7,126,937 B2 * | 10/2006 | Crosbie et al. | ................ | 370/350 |
| 7,508,787 B2 * | 3/2009 | Doshi et al. | ..................... | 370/328 |
| 7,729,328 B2 * | 6/2010 | Thubert et al. | ................. | 370/338 |
| 7,843,807 B2 * | 11/2010 | Thomson | ....................... | 370/216 |
| 7,843,817 B2 * | 11/2010 | Gong et al. | .................... | 370/229 |
| 8,014,329 B2 * | 9/2011 | Gong | .............. | 370/311 |
| 8,037,305 B2 * | 10/2011 | Rahman et al. | ............... | 713/168 |
| 8,040,791 B2 * | 10/2011 | Kruys et al. | ................... | 370/217 |
| 8,085,710 B2 * | 12/2011 | Kumar et al. | .................. | 370/328 |
| 8,149,737 B2 * | 4/2012 | Metke et al. | ................... | 370/256 |
| 8,160,600 B2 * | 4/2012 | Saidi et al. | .................. | 455/452.1 |
| 8,213,395 B2 * | 7/2012 | Trachewsky et al. | ......... | 370/338 |
| 2002/0114303 A1 * | 8/2002 | Crosbie et al. | ................ | 370/338 |
| 2002/0150094 A1 * | 10/2002 | Cheng et al. | ................... | 370/389 |
| 2004/0166812 A1 * | 8/2004 | Lumelsky | ................... | 455/67.11 |
| 2006/0120384 A1 * | 6/2006 | Boutboul et al. | .............. | 370/400 |
| 2006/0215582 A1 * | 9/2006 | Castagnoli et al. | ........... | 370/254 |
| 2006/0215583 A1 * | 9/2006 | Castagnoli | ..................... | 370/254 |
| 2007/0250713 A1 * | 10/2007 | Rahman et al. | ............... | 713/171 |
| 2008/0291855 A1 * | 11/2008 | Bata et al. | ...................... | 370/311 |
| 2009/0116411 A1 * | 5/2009 | Castagnoli et al. | ........... | 370/256 |
| 2009/0135750 A1 * | 5/2009 | Ratiu et al. | .................... | 370/310 |
| 2009/0238160 A1 * | 9/2009 | Bhatti et al. | ................... | 370/338 |
| 2009/0323587 A1 * | 12/2009 | Trachewsky et al. | ......... | 370/328 |
| 2010/0111000 A1 * | 5/2010 | Saidi et al. | ..................... | 370/329 |

* cited by examiner

*Primary Examiner* — Steven H Nguyen

(57) ABSTRACT

An example embodiment includes an apparatus. The apparatus includes piconet logic for establishing a multi-level piconet hierarchy having a top level piconet and a lower level piconet(s). The top level piconet includes the apparatus and a master controller(s). The apparatus is a master device in the top level piconet. Master controllers are slave devices in the top level piconet. A lower level piconet includes a master controller and a sub-controller(s). Master controllers are masters in the lower level piconet. Sub-controllers are slave devices in the lower level piconet. The apparatus includes time division multiplexing logic to solicit and control aggregated communication with master controllers. The aggregated communication comprises data from the master controller and data from a sub-controller(s). The apparatus includes de-aggregation logic to receive the aggregated communication and to separate data.

20 Claims, 11 Drawing Sheets

MULTI-LEVEL PICONET DATA AGGREGATION

CROSS REFERENCE TO RELATED APPLICATIONS

This application claims the benefit of U.S. provisional application Ser. No. 61/171,724, filed on Apr. 22, 2009 which is hereby incorporated by reference.

BACKGROUND

Home video game systems may allow a game console to detect and respond to the motion of game controllers. More generally, a central controller can communicate with a set of remote devices that provide data to the central controller for real time processing. Several different technologies, including Bluetooth wireless technology, support this type of processing. More generally, wireless technologies may support electronics platforms that employ multiple remote controllers.

A conventional controller may support up to four wireless controllers that are commonly referred to as "remote controllers". The four wireless controllers may be allocated in different ways. For example, one player may have four input points (e.g., right hand, left hand, right foot, left foot), or four players may each have a single input point. A remote controller may have controller buttons similar to those found on previous game controller pads. A remote controller may also have an internal motion sensor that accurately measures controller movement, orientation, and acceleration. Thus, the remote controllers may collect data to be transmitted to the central controller. For realistic game play without undesirable lags, the data needs to be transmitted to the central controller in a timely fashion. Therefore the remote controllers include circuitry to transmit controller data (e.g., button presses, controller movements) to the game console where the data can be processed to control the game console output (e.g., video game graphics).

Input latency is the delay between an action being taken at a controller (e.g., button press) and a corresponding action being taken by a program at the console (e.g., display avatar throwing ball). Since the quality of the game experience depends, at least in part, on how quickly a display can be updated to reflect an input at a remote controller, input latency is a concern for gaming systems. More generally, input latency can be a concern for other time slicing systems tasked with producing real time results based on input from multiple remote devices. Thus, input latency issues are not confined to gaming systems.

A central controller communicates with the set of remote controllers according to a time division multiplexing (TDM) scheme. In order to give each remote device a turn to communicate, and in order to satisfy input latency requirements, the central controller limits the number of devices to which time slices can be provided. If there are too many time slices, then conventionally the latency for responding to an input from a device may exceed a desired performance threshold. Based, at least in part, on a 16 ms frame refresh rate for a television, a conventional system imposes a limit of four controllers that are each provided with one time slice per 5 ms.

A conventional system may use Bluetooth (BT) technology for wireless communications. Bluetooth works efficiently and delivers acceptably low latency needed for "real-time applications" (e.g., video games) for a limited number of remote devices. While the BT specification allows for up to seven BT-enabled devices to communicate with a BT controller, some conventional systems only allow four remote controllers to communicate with the console. Thus, attempts to connect more than four remote controllers to a console while providing acceptable input latency given 16 ms television refresh rates have been undertaken. More generally, attempts to connect more than seven BT-enabled devices to a BT controller while providing acceptable input latency given real time application demands and/or device refresh rate demands have been attempted. Even more generally, attempts to connect a number of wireless devices to a wireless controller, where the number of wireless devices exceeds the number of devices that the wireless controller provides time slots for in a TDM scheme have been attempted.

SUMMARY

In one embodiment, an apparatus includes piconet logic configured to establish a multi-level piconet hierarchy having a top level piconet and one or more lower level piconets. The top level piconet includes the apparatus and one or more master controllers. The apparatus is configured as a master device in the top level piconet, and the one or more master controllers are configured as slave devices in the top level piconet. A lower level piconet includes a master controller and one or more sub-controllers. The master controller is a master in the lower level piconet, and the one or more sub-controllers are slave devices in the lower level piconet. The apparatus includes time division multiplexing logic to solicit and control aggregated communication with the one or more master controllers in the top-level piconet. The aggregated communication comprises an aggregation of (i) data from the master controller in the piconet and (ii) data from one or more sub-controllers in the piconet. The apparatus also includes de-aggregation logic to receive the aggregated communication and to separate the data associated with the master controller in the piconet from the data associated with the one or more sub-controllers in the piconet.

In another embodiment, an apparatus includes time slice logic to identify an opportunity to transmit master controller data as part of a time division multiplexing scheme. The time division multiplexing scheme controls communication in a multi-level piconet hierarchy. The multi-level piconet hierarchy comprises a top level piconet and one or more lower level piconets. The top level piconet includes a console and one or more master controllers. The apparatus is one of the one or more master controllers. The console is configured as a master device in the top level piconet, and the one or more master controllers are configured as slave devices in the top level piconet. A lower level piconet includes a master controller and one or more sub-controllers. The master controller in a lower level piconet is configured as a master in the lower level piconet. The one or more sub-controllers are configured as slave devices in the lower level piconet. The apparatus includes aggregation logic to produce the master controller data. The master controller data comprises an aggregation of (i) data from one or more sub-controllers configured in a lower-level piconet that includes the apparatus and (ii) data from the apparatus.

In another embodiment, a system includes a first apparatus and a second apparatus. The first apparatus includes piconet logic configured to establish a two-level piconet hierarchy, the two-level piconet hierarchy comprising a top level piconet and one or more lower level piconets. The top level piconet includes the first apparatus and one or more master controllers. The apparatus is configured as a master device in the top level piconet, and the one or more master controllers are configured as slave devices in the top level piconet. The lower level piconet includes a master controller and one or more sub-controllers. The master controller is configured as a master in the lower level piconet, and the one or more sub-controllers are configured as slave devices in the lower level piconet. The first apparatus includes time division multiplexing logic configured to control aggregated communication with the one or more master controllers in the top-level piconet according to a time division multiplexing scheme. The aggregated communication comprises an aggregation of (i) data from the master controller and (ii) data from one or more sub-controllers. The first apparatus also includes de-aggregation logic configured to receive the aggregated communication and to separate the data associated with the master controller from the data associated with the one or more sub-controllers. The system also includes a plurality of second apparatuses. A second apparatus is configured as a master controller. A second apparatus comprises time slice logic configured to identify an opportunity to transmit outbound data as controlled by the time division multiplexing scheme; and aggregation logic configured to produce the outbound data. The outbound data comprises an aggregation of (i) data from one or more sub-controllers configured in a lower-level piconet that includes the second apparatus and (i) data from the second apparatus.

In another embodiment, a method includes establishing a top-level piconet comprising a console and a plurality of master controllers. The plurality of master controllers are configured to communicate with the console during a time period controlled by a console-driven time division multiplexing plan. The console is configured as a master device in the top-level piconet, and the plurality of master controllers are configured as a slave device in the top-level piconet. The method includes establishing a first piconet comprising (i) a master controller and (ii) one or more sub-controllers configured to communicate with the master controller. The master controller is configured as a master device in the first piconet, and the one or more sub-controllers are configured as slave devices in the first piconet. The method includes controlling the master controller to produce an aggregate data comprising data from the one or more sub-controllers and data from the master controller. The method includes controlling the master controller to transmit the aggregate data to the console during the time period. The time division multiplexing plan is configured so that the console satisfies an input latency threshold for members of the top-level piconet and members of the first piconet. The time division multiplexing plan provides one opportunity to transmit per master controller in the top-level piconet per time period.

BRIEF DESCRIPTION OF THE DRAWINGS

The accompanying drawings, which are incorporated in and constitute a part of the specification, illustrate various examples of systems, methods, and other embodiments of various aspects of the invention. The illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of another element may be implemented as an external component and vice versa. Furthermore, elements may not be drawn to scale.

DETAILED DESCRIPTION

The disclosure describes apparatuses and methods for multi-level piconet data aggregation that facilitate including more controllers in a lower level piconet than conventional systems while mitigating issues associated with input latency. While examples are provided using the context of gaming platforms and other consumer electronics platforms that require multiple remote controllers, the disclosure is not intended to be limited to video gaming.

The following includes definitions of selected terms employed herein. The definitions include various examples and/or forms of components that fall within the scope of a term and that may be used for implementation. The examples are not intended to be limiting. Both singular and plural forms of terms may be used within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 1:
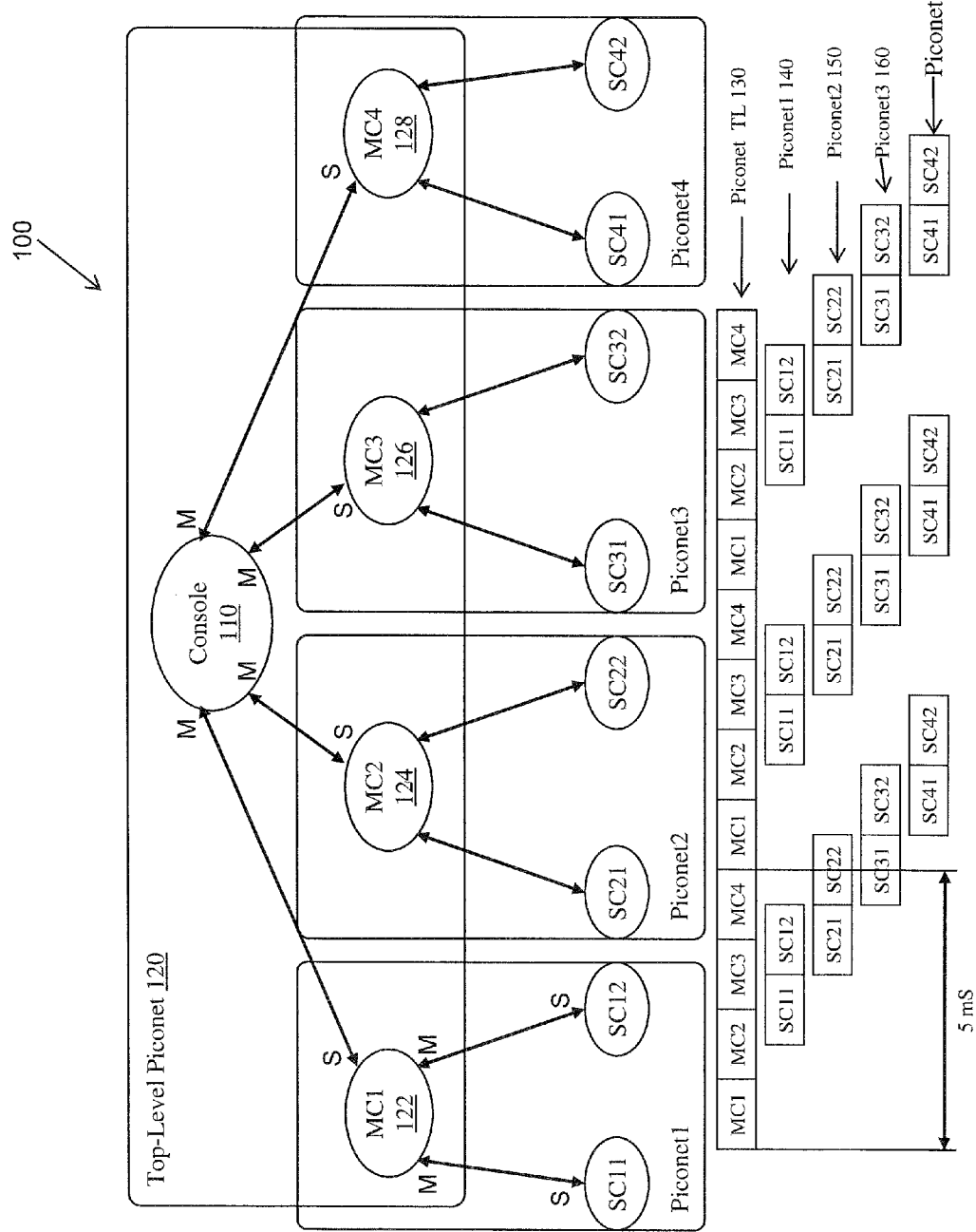
FIG. 1 illustrates five piconets arranged in a scatternet having twelve controllers where data aggregation is not performed.

FIG. 1 illustrates a scatternet 100 having a total of twelve controllers communicating with a console 110. The twelve controllers are arranged in five piconets, including four separate three controller piconets. The five piconets include a top-level piconet 120, piconet1, piconet2, piconet3, and piconet4. The top-level piconet 120 includes the console 110 and four master controllers (MC1 122, MC2 124, MC3 126, MC4 128). The console 110 is configured as a master in the top-level piconet 120 while MC1 122, MC2 124, MC3 126, and MC4 128 operate as slaves in the top-level piconet 120. In piconet1, MC1 122 is configured as a master while sub-controllers SC11 and SC12 operate as slaves. In piconet2, MC2 124 is configured as a master while sub-controllers SC21 and SC22 operate as slaves. In piconet3, MC3 126 is configured as a master while sub-controllers SC31 and SC32 operate as slaves. In piconet4, MC4 128 is configured as a master while sub-controllers SC41 and SC42 operate as slaves. Scatternet, as used herein, refers to a type of ad-hoc computer network that includes two or more piconets. Piconet, as used herein, refers to a connection formed between two wireless devices (e.g., Bluetooth-enabled devices).

A time division multiplexing scheme for the top-level piconet 120 is illustrated using the sequence of slices in line 130. The notation MC1 in line 130 indicates that this is a time slot for MC1 122 while the notation MC2 in line 130 indicates that this is a time slot for MC2 124. While a round-robin TDM scheme is illustrated, other TDM schemes may be employed. Time slots during which MC1 122 may communicate with SC11 and SC12 are illustrated in line 140. The notation SC11 in line 140 indicates a time slot when sub-controller SC11 could communicate with MC1 122 in piconet1. Similarly, the notation SC22 in line 140 indicates a time slot when sub-controller SC12 could communicate with MC1 122 in piconet1. The notations SC21 and SC22 in line 150 indicate times when sub-controllers SC21 and SC22 could communicate with MC2 124 in piconet2. The notations SC31 and SC32 in line 160 indicate times when sub-controllers SC31 and SC32 could communicate with MC3 126 in piconet3. The notations SC41 and SC42 in line 170 indicate times when sub-controllers SC41 and SC42 could communicate with MC4 128 in piconet4.

Conventionally, without data aggregation, when the console 110 provides a time slice for MC1 122, then MC1 122 may provide its own data or data from either SC11 or SC12. Therefore it may take up to three communications with MC1 122 to acquire data from MC1 122, SC11 and SC12. This may lead to unacceptable input latency in a scheme like that illustrated in FIG. 1. Subsequent figures will show data traffic when aggregation is used and when aggregation is not used.

While FIG. 1 shows a scheme where acceptable input latency may be achieved for SC11 and SC12, FIG. 1 also illustrates how unacceptable input latency may be created for SC22, SC31, SC32, SC41, and SC42. Time slots for MC2 124, SC21, and SC22 are illustrated in line 150. The data slot for SC22 is illustrated being after the 5 ms window for going around the top level piconet 120 has expired. Time slots for MC3 126, SC31, and SC32 are illustrated in line 160. The data slots for both SC31 and SC32 are illustrated being after the 5 ms window has expired. Time slots for MC4 128, SC41, and SC42 are illustrated in line 170. Once again the data slots for both SC41 and SC42 are illustrated being transmitted after the 5 ms window has expired. Thus, while SC11, SC12, and SC21 may have acceptable input latency, other controllers may not. Therefore, example apparatuses and methods described herein may aggregate data to prevent unacceptable input latency.

Figure 2:
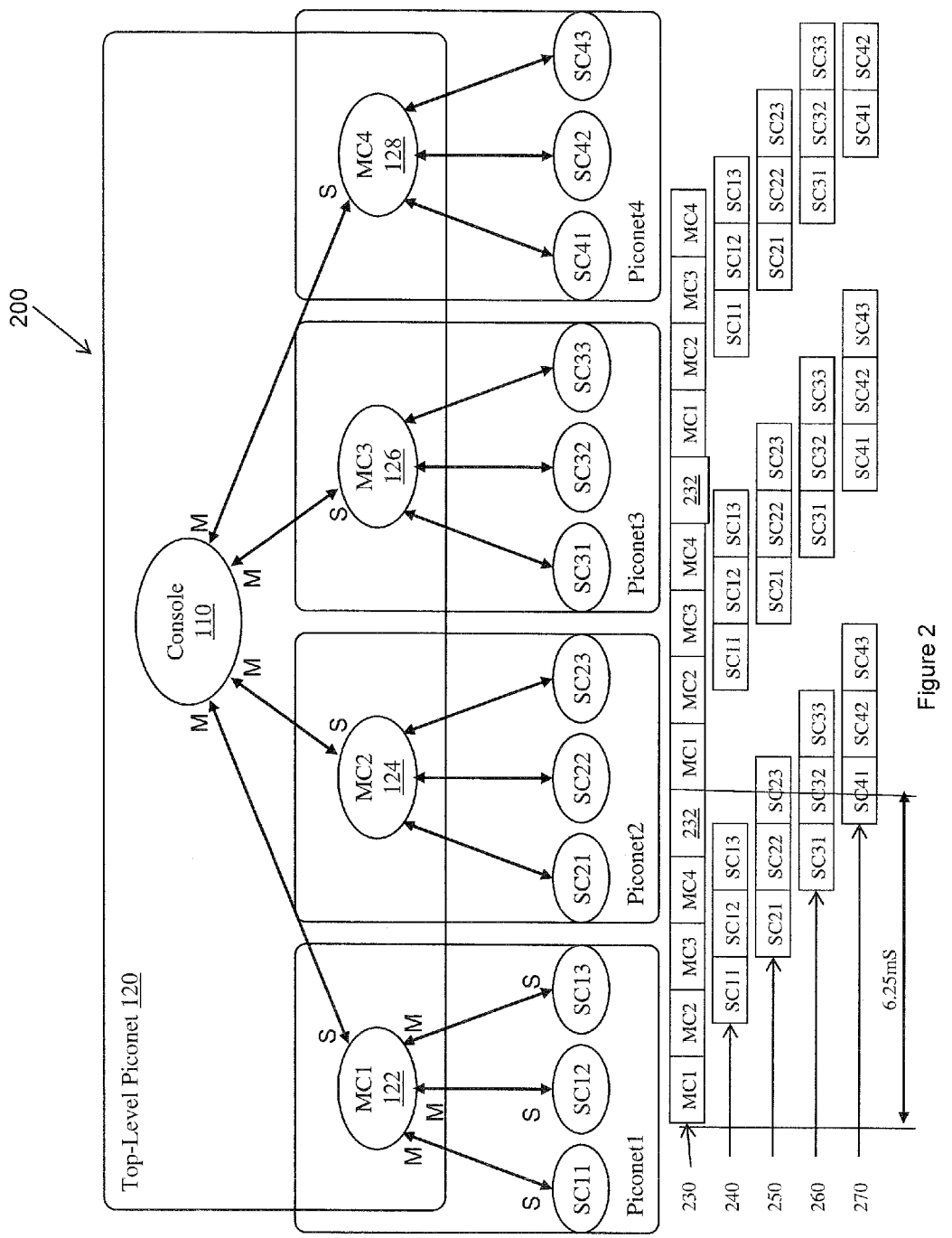
FIG. 2 illustrates five piconets arranged in a scatternet having sixteen controllers where data aggregation is not performed.

FIG. 2 illustrates a scatternet 200 having a total of sixteen controllers communicating with console 110. The sixteen controllers are arranged in five piconets, including four separate four controller piconets (piconet1, piconet2, piconet3, piconet4). The top-level piconet 120 includes the console 110 and the four master controllers MC1 122, MC2 124, MC3 126, and MC4 128. The console 110 is configured as a master in the top-level piconet 120 while MC1 122, MC2 124, MC3 126, and MC4 128 operate as slaves in the top-level piconet 120. In piconet1, MC1 122 is configured as a master while sub-controllers SC11, SC12, and SC13 operate as slaves. In piconet2, MC2 124 is configured as a master while sub-controllers SC21, SC22, and SC23 operate as slaves. In piconet3, MC3 126 is configured as a master while sub-controllers SC31, SC32, and SC33 operate as slaves. In piconet4, MC4 128 is configured as a master while sub-controllers SC41, SC42, and SC43 operate as slaves.

Time slots for a round robin time division multiplexing scheme for the top level piconet 120 are illustrated in line 230. Note than an extra empty time slot 232 has been added to the TDM scheme. Adding extra time slot 232 increases the 5 ms period to go around the top level piconet 120 used in FIG. 1 to a 6.25 ms period for going around the top level piconet 120 in FIG. 2. Increasing the 5 ms period to a 6.25 ms period provides a time slot for MC1 to communicate with SC13 during one trip around top level piconet 120. Thus, acceptable input latency may be achieved in piconet1. However, as illustrated in lines 240, 250, 260, and 270, unacceptable input latency may occur for piconet2, piconet3, and piconet4. Thus, while it may be physically possible to connect the sixteen controllers as illustrated in FIG. 2, conventional scatternets that do not use aggregation may produce unacceptable input latency.

The notation MC1 in line 230 indicates that this is a time slot for MC1 122 while the notation MC2 in line 230 indicates that this is a time slot for MC2 124. The same notation holds for MC3 and MC4 in lines 230. While a round-robin TDM scheme is illustrated, other TDM schemes may be employed. Time slots during which MC1 122 may communicate with SC11, SC12, and SC13 are illustrated in line 240. The notation SC11 in line 240 indicates a time slot when sub-controller SC11 could communicate with MC1 122 in piconet1. Similarly, the notation SC12 in line 240 indicates a time slot when sub-controller SC12 could communicate with MC1 122 in piconet1. The notations SC21, SC22, and SC23 in line 250 indicate times when sub-controllers SC21, SC22 and SC23 could communicate with MC2 124 in piconet2. The notations SC31, SC32, and SC33 in line 260 indicate times when sub-controllers SC31, SC32, and SC33 could communicate with MC3 126 in piconet3. The notations SC41, SC42, and SC43 in line 270 indicate times when sub-controllers SC41, SC42, and SC43 could communicate with MC4 128 in piconet4.

Figure 3:
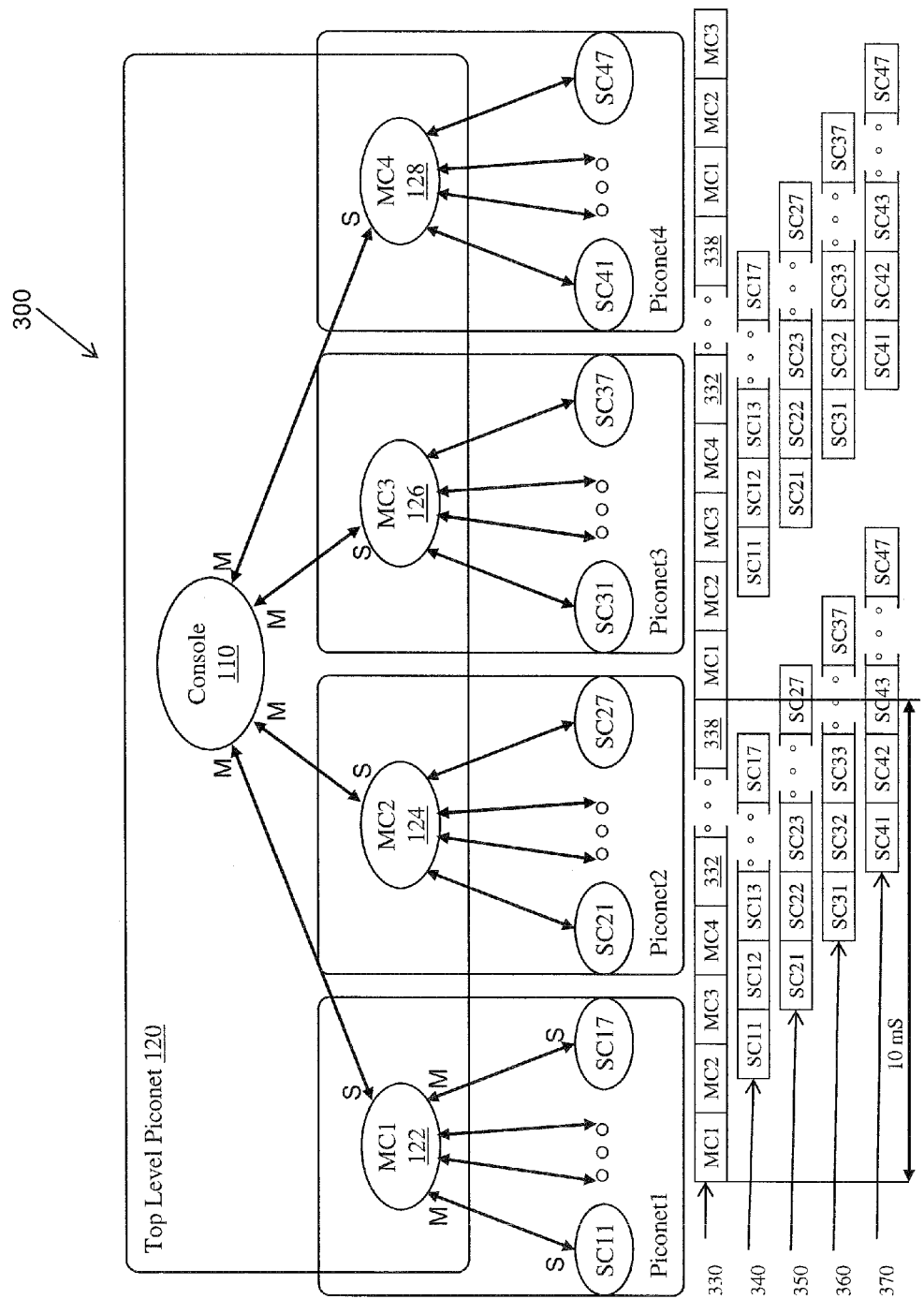
FIG. 3 illustrates five piconets arranged in a scatternet having thirty two controllers where data aggregation is not performed.

FIG. 3 illustrates a scatternet 300 having a total of thirty two controllers communicating with console 110. The thirty two controllers are arranged in five piconets including a top level piconet 120 and four piconets having seven sub-controllers each. The top-level piconet 120 includes the console 110 and the four master controllers MC1 122, MC2 124, MC3 126, and MC4 128. The console 110 is configured as a master in the top-level piconet 120 while MC1 122, MC2 124, MC3 126, and MC4 128 operate as slaves in the top-level piconet 120. In piconet1, MC1 122 is configured as a master while sub-controllers SC11 through SC17 operate as slaves. In piconet2, MC2 124 is configured as a master while sub-controllers SC21 through SC27 operate as slaves. In piconet3, MC3 126 is configured as a master while sub-controllers SC31 through SC37 operate as slaves. In piconet4, MC4 128 is configured as a master while sub-controllers SC41 through SC47 operate as slaves.

A time division multiplexing scheme for the top level piconet 120 in FIG. 3 is illustrated in line 330. Empty time slots 332 through 338 have been added to the scheme to provide time for SC13 through SC17 to have opportunities to communicate. Adding these extra slots increases the time to go around the top level piconet 120 to 10 ms. In general, extending the time required to go around the top level piconet 120 provides more opportunities but also increases the likelihood that unacceptable input latency will occur.

The notation MC1 in line 330 indicates that this is a time slot for MC1 122 while the notation MC2 in line 330 indicates that this is a time slot for MC2 124. The same notation holds for MC3 and MC4. While a round-robin TDM scheme is illustrated, other TDM schemes may be employed. Time slots during which MC1 122 may communicate with SC11 through SC17 are illustrated in line 340. The notation SC11 in line 340 indicates a time slot when sub-controller SC11 could communicate with MC1 122 in piconet1. Similarly, the notations SC12 through SC17 in line 240 indicate time slots when sub-controllers SC12 through SC17 could communicate with MC1 122 in piconet1. Similar notations hold for lines 350, 360, and 370.

Figure 4:
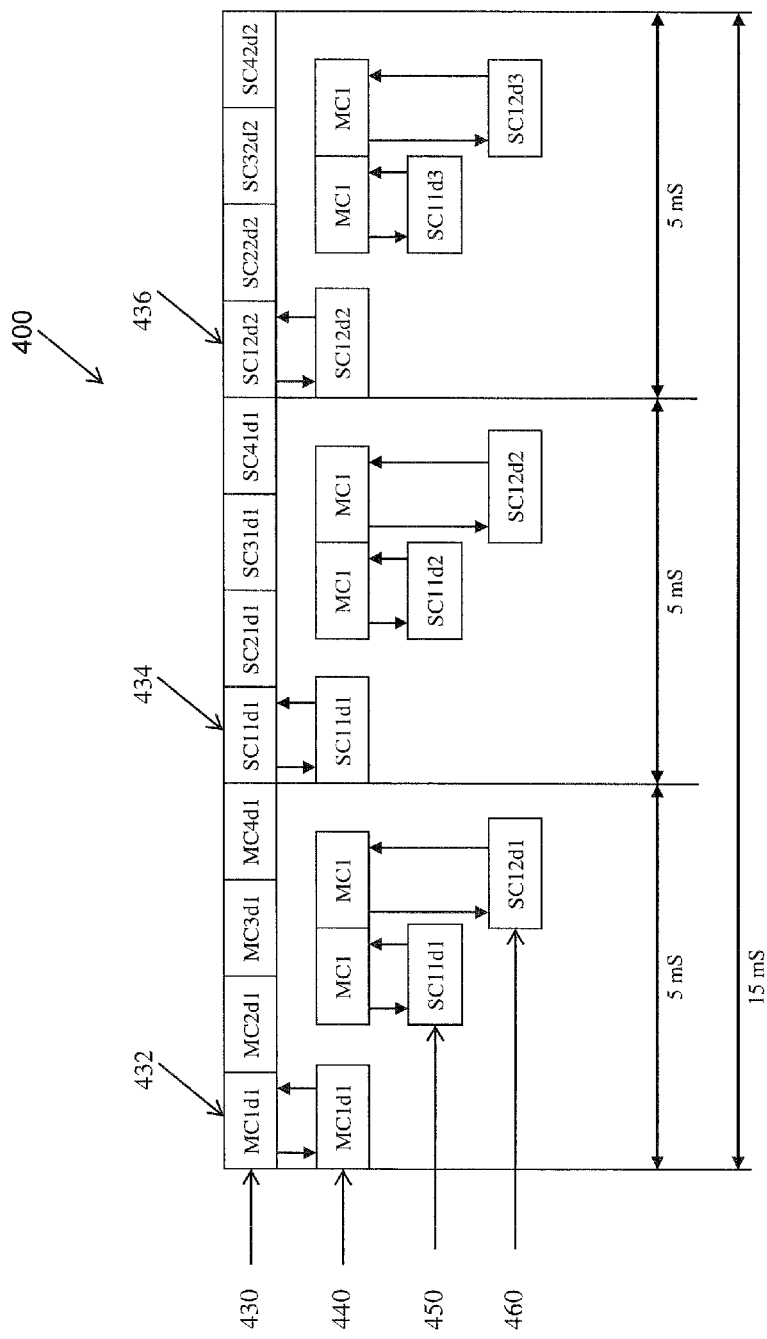
FIG. 4 illustrates traffic associated with MC1 in FIG. 1 when aggregation is not performed.

FIG. 4 illustrates a traffic flow 400 associated with the first master controller MC1 122 as arranged in FIG. 1 where there are two sub-controllers per master controller in four piconets for a total of 12 controllers. This traffic would be produced if data from sub-controllers in piconet1 was not aggregated with data from MC1 122 when MC1 122 communicated data to the console 110. Traffic from MC2 124, MC3 126, and MC4 128 is not illustrated. The console line 430 illustrates a round robin scheme for providing a time slot for every controller in top level piconet 120 and in piconet1 through piconet4. The console 110 and TDM scheme would provide an opportunity for data from MC1 122 at the start of the first 5 ms time period (e.g., slot 432), provide an opportunity for data from SC11 at the start of the second 5 ms time period (e.g., slot 434), and provide an opportunity for data from SC12 at the start of the third 5 ms time period (e.g., slot 436). The scheme illustrated in FIG. 4 yields a 15 ms period per controller to console 110 and yields a 20 ms worst case latency. The 15 ms period per controller describes how long it takes to acquire data from a master controller and all its related sub-controllers. Given that a television to which the console 110 may be connected may have a 16 ms refresh rate, the 20 ms worst case latency may be unacceptable for real time applications like video games. Thus, while the TDM scheme illustrated in FIG. 4 provides an opportunity for each of the 12 sub-controllers to communicate, the communication may occur at the expense of unacceptable input latency.

The console line 430 illustrates a time slot 432 during which the console 110 requests the first data from MC1 122. The notation MC1$d$1 represents MC1, data 1. In response to the opportunity provided in time slot 432, first data from MC1 122 may be provided to the console. Additionally, MC1 122 may acquire data from its related sub-controllers. Thus, line 450 illustrates first data SC11$d$1 being provided from SC11 to MC1. Similarly, line 460 illustrates first data SC12$d$1 being provided from SC12 to MC1 122. The console may request data from SC11 at time 434. Since MC1 122 will provide the data, MC1 122 may also acquire second data from SC11 and SC12. Thus line 450 illustrates SC11$d$2 being provided to MC1 122 and line 460 illustrates SC12$d$2 being provided to MC1 122. At time 436, the console 110 may request data from SC12. Other TDM schemes may request data from master controllers and sub-controllers using different plans.

Figure 5:
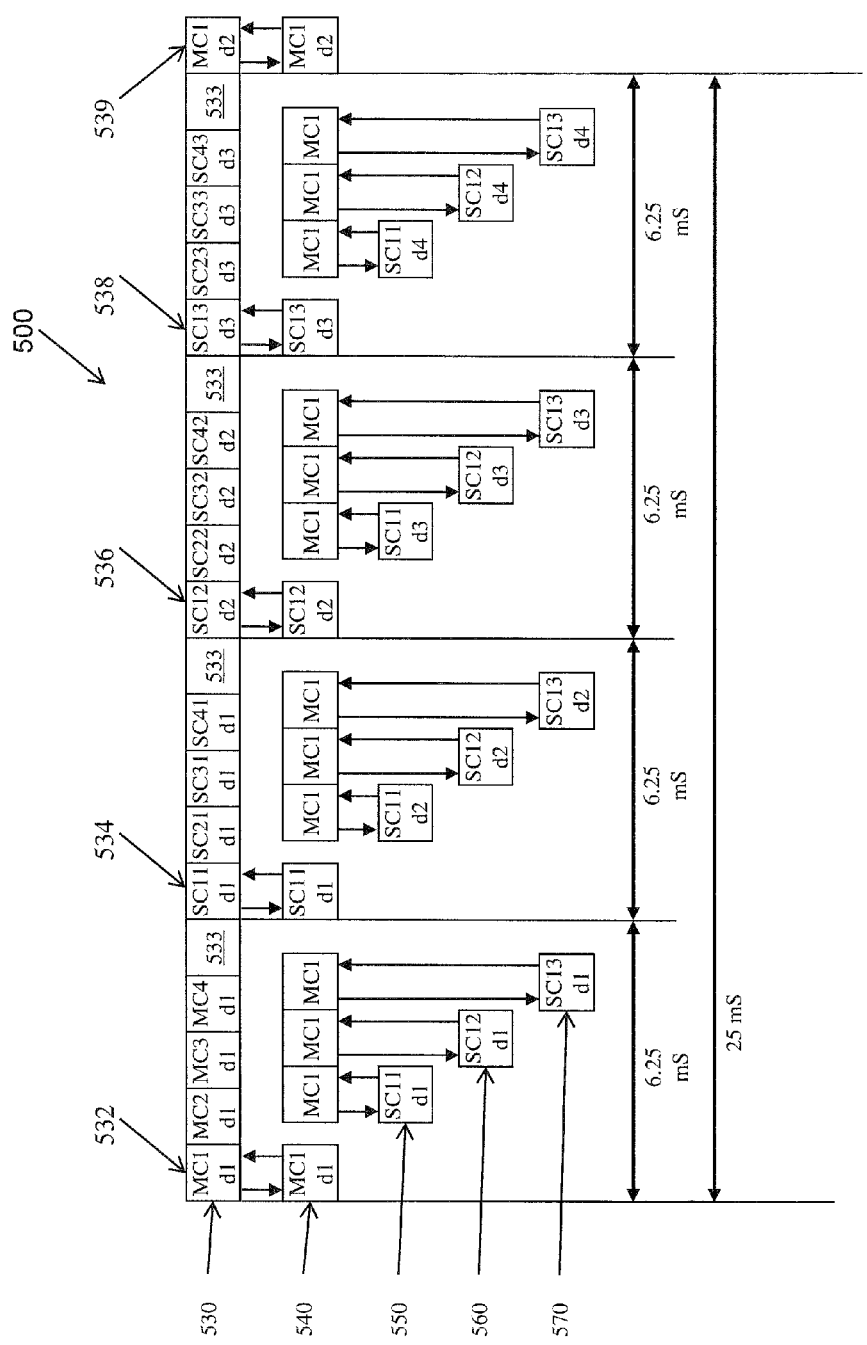
FIG. 5 illustrates traffic associated with MC1 in FIG. 2 when aggregation is not performed.

FIG. 5 illustrates a traffic flow 500 associated with MC1 122 as arranged in FIG. 2 where there are three sub-controllers per master controller in four piconets for a total of 16 controllers. This traffic would be produced if data from sub-controllers in the first piconet was not aggregated with data from MC1 122. Data associated with piconet2, piconet3, and piconet4 is not illustrated. Since piconet1 includes three sub-controllers instead of two, FIG. 5 illustrates how additional controllers create additional input latency issues with conventional non-aggregating schemes.

The console line 530 illustrates a TDM scheme where the console 110 provides an opportunity for every master controller and every sub-controller. Because the first piconet has three sub-controllers, the 5 ms time period in FIG. 4 has been extended to a 6.25 ms time period in FIG. 5 to allow enough time to go all the way around a piconet that has a master controller and three sub-controllers. The 5 ms time period has been extended to 6.25 ms by including a 1.25 ms "phantom" slot 533 where the console 110 does not seek data from the master controllers in the top-level piconet but during which the master controllers can handle data from the last reporting of their sub-controllers. This additional 1.25 ms allows enough time for controllers and sub-controllers to communicate data but may yield unacceptable input latency. The conventional scheme illustrated in FIG. 5 yields a 25 ms period per controller to console 110 and also yields a 30 ms worst case latency. Once again, given that a television to which the console may be connected may have a 16 ms refresh rate, the 30 ms worst case latency may be unacceptable for real time applications like video games. Therefore, example apparatuses and methods aggregate data to yield reduced input latency times.

Line 540 illustrates first data MC1$d$1 being provided at slot 532. After slot 532, line 550 illustrates first data SC11$d$1 being provided to MC1 122, line 560 illustrates first data SC12$d$1 being provided to MC1 122, and line 570 illustrates first data SC13$d$1 being provided to MC1 122. This data can be provided to the console 110 at times 534, 536, and 538. For example, at 534, the console 110 may request the first data from SC11. In response to this request, the first data SC11$d$1 may be provided to the console 110 from MC1 122 and second data (e.g., SC11$d$2, SC12$d$2, SC13$d$2) may be acquired by MC1. This data may also be provided at future time slots. Once again one skilled in the art will appreciate from FIG. 5 how input latency can be exacerbated by additional controllers.

Figure 6:
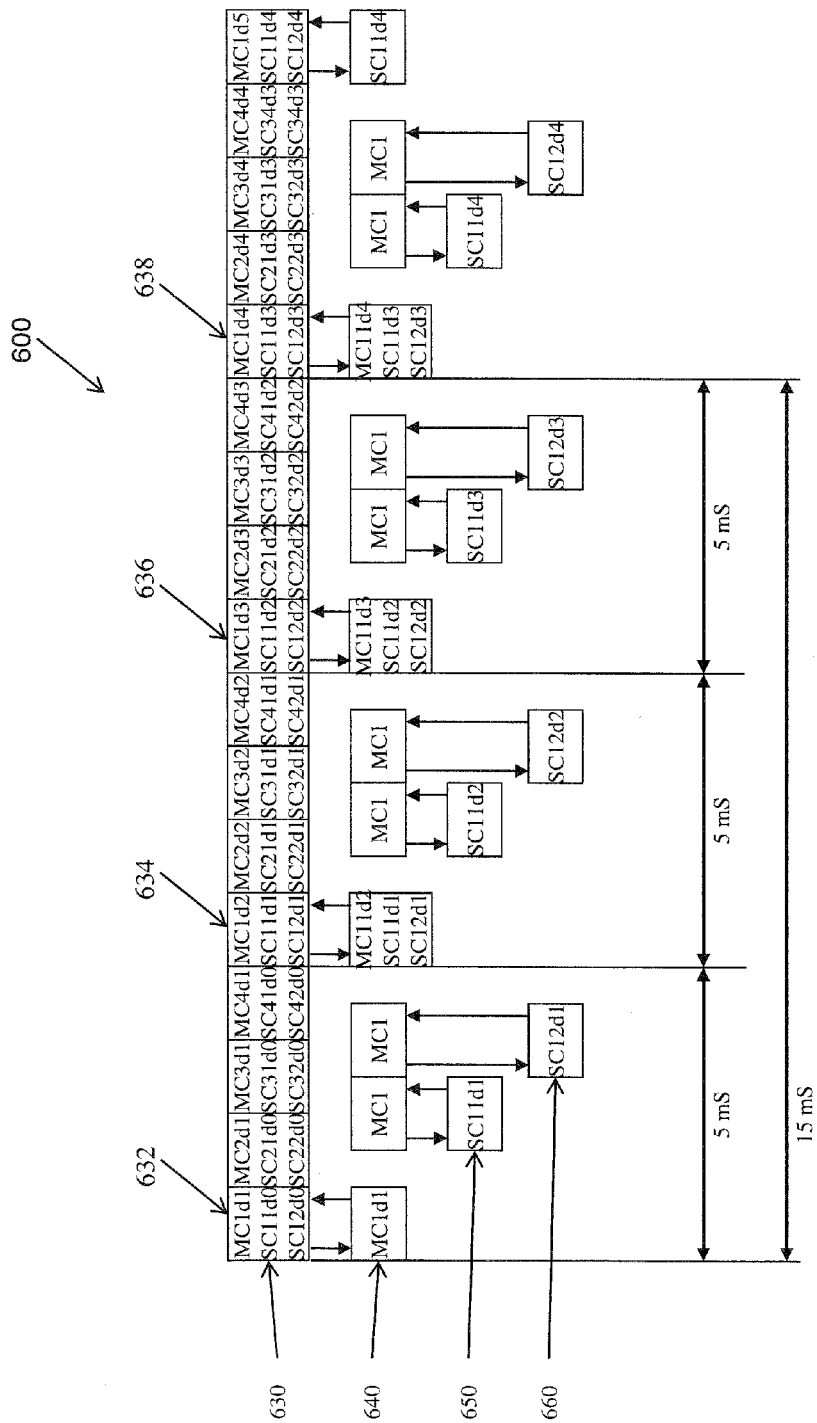
FIG. 6 illustrates traffic associated with MC1 in FIG. 1 when aggregation is performed.

FIG. 6 illustrates traffic associated with MC1 122 as arranged in the first piconet in FIG. 1. This traffic would be produced if data from sub-controllers in the first piconet was aggregated with data from MC1 122 and provided as an aggregation to the console 110 by MC1 122. The console line 630 illustrates how the console 110 would provide an opportunity for data from MC1 122 at the start of the first 5 ms time period (e.g., slice 632), provide another opportunity for data from MC1 122 at the start of the second 5 ms time period (e.g., slice 634), provide another opportunity for data from MC1 122 at the start of the third 5 ms time period (e.g., slice 636), and provide yet another opportunity for data from MC1 122 at the start of the fourth trip around the top-level piconet (e.g., slice 638).

Data from SC11 and SC12 is aggregated together with data from MC1 122. Thus, in response to the opportunity provided to MC1 122 at 632, the console 110 would receive first data MC1$d$1 from MC1 122 along with data zero from SC11 and SC12. After slice 632, MC1 122 could acquire first data SC11$d$1 from SC11 as illustrated at 650 and could acquire first data SC12$d$1 from SC12 as illustrated at 660. These first data could then be aggregated with second data MC1$d$2 from MC1 122 and provided in response to the request at 634. One skilled in the art will appreciate from FIG. 6 that by aggregating data from the sub-controllers into data produced by the master controller, that a shorter input latency can be achieved.

For example, the scheme illustrated in FIG. 6 yields an improved 5 ms period per controller to console as compared to 15 ms period per controller for non-aggregating systems and also yields an improved 8.75 ms worst case latency. Given that a television to which the console may be connected may have a 16 ms refresh rate, the 8.75 ms worst case latency is likely acceptable for real time applications like video games.

Figure 7:
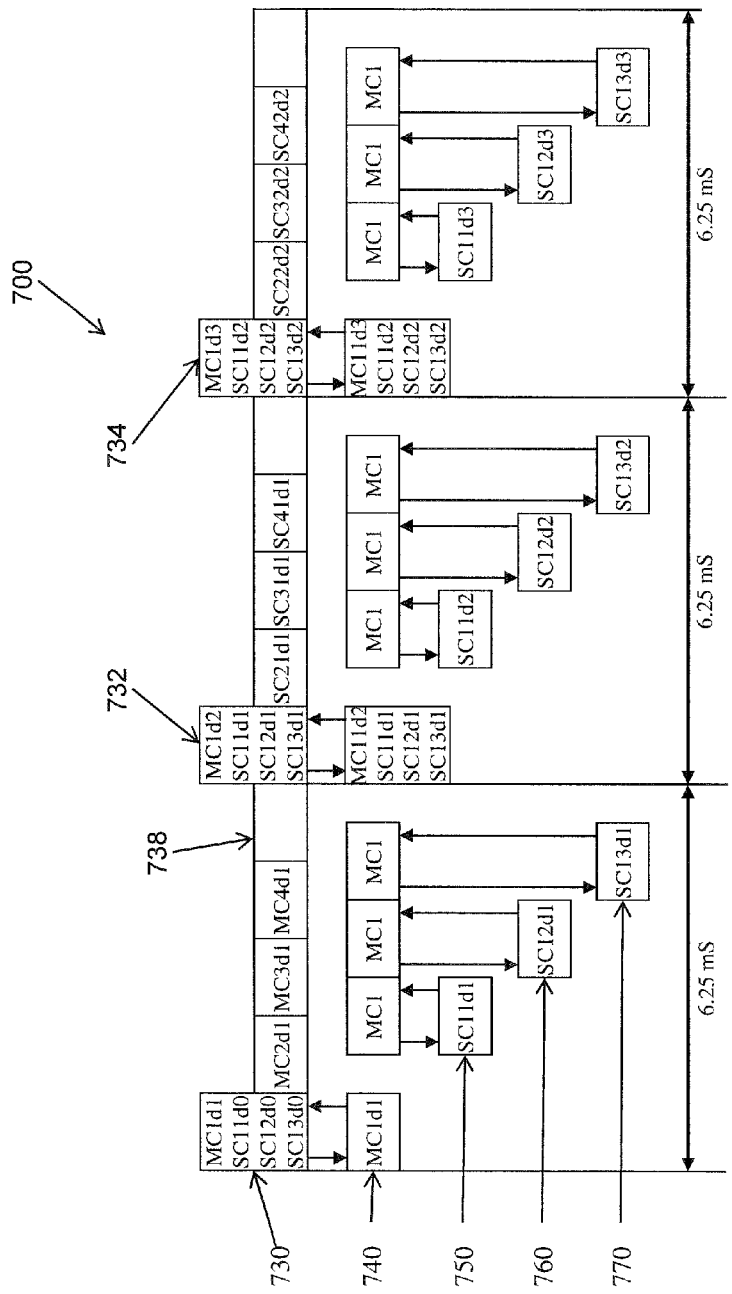
FIG. 7 illustrates traffic associated with MC1 in FIG. 2 when aggregation is performed.

FIG. 7 illustrates traffic associated with MC1 122 as arranged in the first piconet in FIG. 2. This traffic would be produced if data from sub-controllers in the first piconet was aggregated with data from MC1 122. The console line 730 illustrates aggregated data that would be transmitted from MC1 122 to the console 110. Notice that data from SC11, SC12, and SC13 is aggregated together with data from MC1 122. Note also that empty slot 738 provides enough time for a third sub-controller to provide data to MC1 122.

Lines 730 and 740 show an initial transfer from only MC1 to the console 110 (e.g., MC1d1, SC11d0, SC12d0, SC13d0) at 730. However, line 750 illustrates how first data SC11d1 is collected from SC11 and provided to MC1 122, line 760 illustrates how first data SC12d1 is collected from SC12 and provided to MC1 122, and line 770 illustrates how first data SC13d1 is collected from SC13 and provided to MC1 122. Subsequent time slices for MC1 122 (e.g., 732, 734) show data aggregations being provided from MC1 122 to the console 110.

The scheme illustrated in FIG. 7 yields an improved 6.25 ms period per controller to console and also yields an improved 11.25 ms worst case latency. Once again, given that a television to which the console may be connected may have a 16 ms refresh rate, the 11.25 ms worst case latency is likely acceptable for real time applications like video games.

Figure 8:
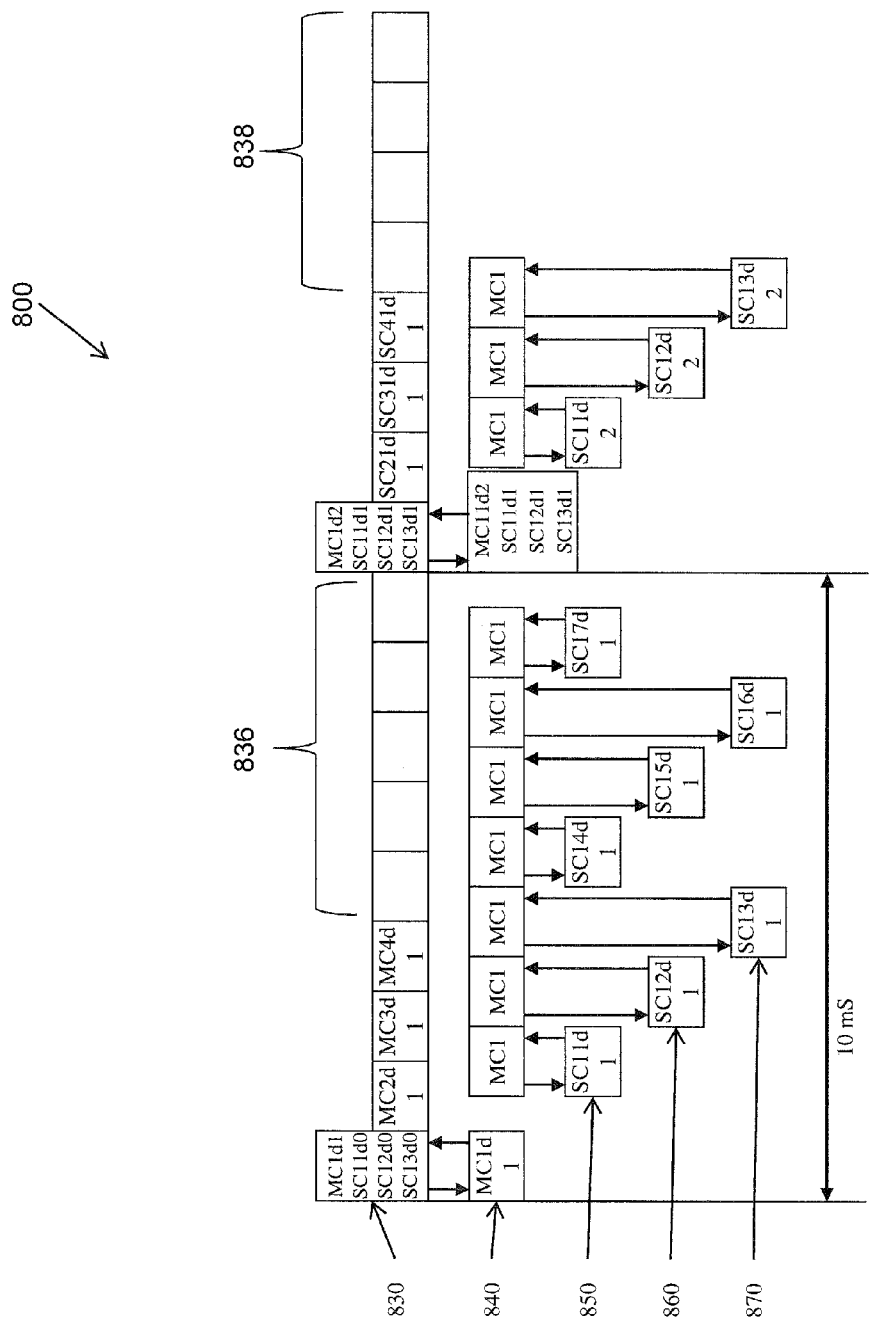
FIG. 8 illustrates traffic associated with MC1 in FIG. 3 when aggregation is performed.

FIG. 8 illustrates traffic associated with MC1 122 as arranged in the first piconet in FIG. 3. This traffic would be produced if data from sub-controllers in the first piconet was aggregated with data from MC1 122. The console line 830 illustrates aggregations of data that would be transferred from MC1 122 at the start of the first 10 ms time period (e.g., slice 832) and at the start of the second 10 ms time period (e.g., 834). Notice that data from SC11 through SC17 is aggregated together with data from MC1 122. Lines 830 and 840 show an initial transfer from only MC1 to the console 110 (e.g., MC1d1, SC11d0, SC12d0, SC13d0, . . . ) at 832. However, line 850 illustrates how first data SC11d1 is collected from SC11 and provided to MC1 122, how first data SC41d1 is collected from SC14 and provided to MC1 122, and how first data SC71d1 is collected from SC17 and provided to MC1 122. Similarly, line 860 illustrates how first data SC12d1 and first data SC15d1 are collected and provided to MC1 122, and line 870 illustrates how first data SC13d1 and first data SC16d1 is collected and provided to MC1 122. Subsequent time slices for MC1 122 (e.g., 834) show data aggregations being provided from MC1 122 to the console 110. While an aggregation for SC11, SC12, and SC13 is illustrated, one skilled in the art will appreciate from FIG. 8 and from the teachings herein that other aggregations can be created and provided.

The scheme illustrated in FIG. 8 yields an 11.25 ms period per controller to console and also yields 21.25 ms worst case latency. The scheme illustrated in FIG. 8 includes phantom slots 836 and 838. The phantom slots 836 and 838 provide opportunities for MC1 to collect data from its sub-controllers and to aggregate that data for delivery as an aggregate to the console 110.

Figure 9:
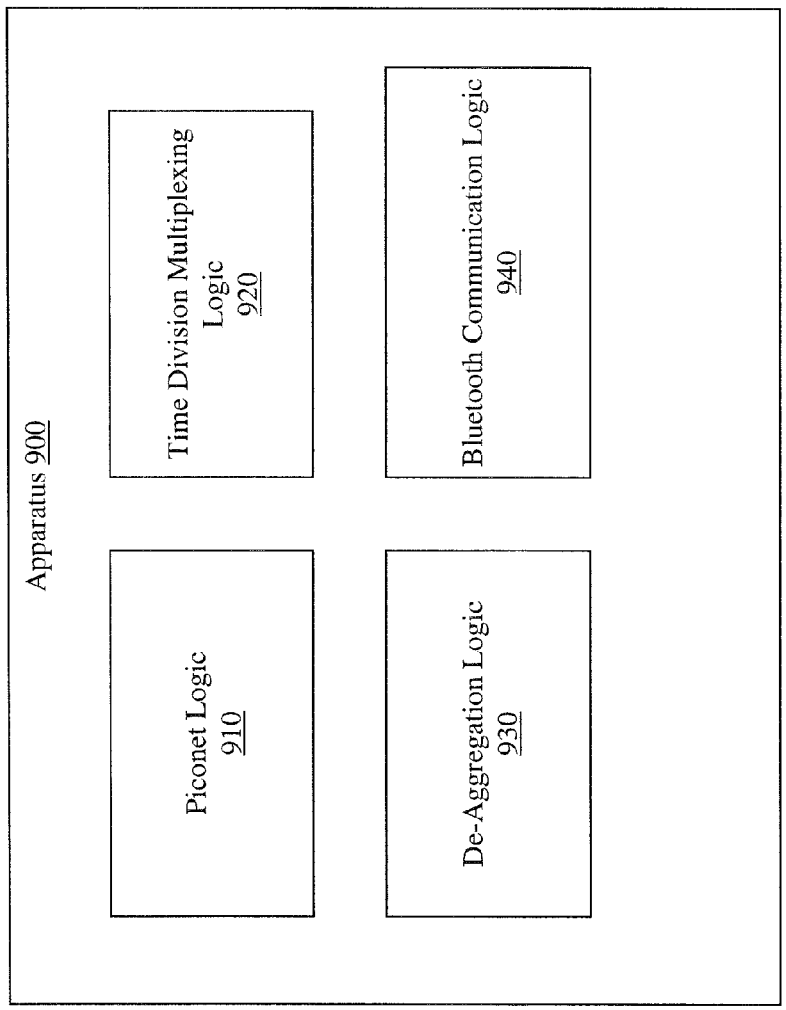
FIG. 9 illustrates an apparatus 900 associated with multi-level piconet data aggregation.

FIG. 9 illustrates an apparatus 900 associated with multi-level piconet data aggregation. Apparatus 900 includes a piconet logic 910, a time division multiplexing logic 920, and a de-aggregation logic 930. In one embodiment, apparatus 900 may also include a Bluetooth communication logic 940.

The piconet logic 910 establishes a two-level piconet hierarchy having a top level piconet and one or more lower level piconets. See, for example, the piconets illustrated in FIGS. 1-3. The top level piconet includes the apparatus 900 and a master controller (e.g., MC1 122) or master controllers (e.g., MC1 122, MC2 124, MC3 126, MC4 128). The apparatus 900 is a master device in the top level piconet and the master controller(s) are slave devices in the top level piconet. A lower level piconet includes a master controller and one or more sub-controllers. In the lower level piconet, the master controller is a master and the one or more sub-controllers are slave devices.

The time division multiplexing logic 920 controls aggregated communication with the master controller(s) in the top-level piconet. A communication with a master controller includes an aggregation of data from the master controller and the sub-controllers that are in the lower level piconet with the master controller.

The de-aggregation logic 930 separates data associated with the master controller from data associated with the one or more sub-controllers. Recall that a master controller communication will include data from both a master controller and sub-controllers that are in a lower level piconet with the master controller.

Apparatus 900 can accommodate different configurations of piconets. In one example there may be four lower level piconets. In different examples, a lower level piconet may have different numbers of sub-controllers. Thus, in one example, a console may connect to four master remote controllers that in turn are each connected to two, three, or more remote controllers. In one configuration, a lower level piconet may include a set of sub-controllers that are all assigned to one game player. For example, the master controller may be connected to the player's left wrist and sub-controllers may be connected to the player's feet. One skilled in the art will appreciate that master controllers and sub-controllers may be arranged in different configurations for different applications. For example, in an application where a group of players are all pretending to be in a rock band, a guitar player may have different remote controllers than a drummer. Similarly, in an application where some players are pretending to be infantry soldiers while other players are pretending to be pilots, different numbers and configurations of remote controllers may be present. Therefore, piconet logic 910 can create different top-level piconets and different lower level piconets based on different applications.

In one example, a lower level piconet may include a maximum of two sub-controllers. In this example, the time division multiplexing logic 920 acquires acquire data from the four piconets using a four slice, 5 ms time division multiplexing scheme. In another example, a lower level piconet may include a maximum of three sub-controllers. In this example, the time division multiplexing logic 920 acquires data from the four piconets using a five slice, 6.25 ms time division multiplexing scheme, where one of the five slices does not address any of the members of the top-level piconet. In yet another example, a lower level piconet has up to seven sub-controllers. In this example, the time division multiplexing logic 920 acquires data from the four piconets using a time division multiplexing scheme that has a number of slices equal to one more than the number of sub-controllers in the lower level piconet having the most sub-controllers.

In one example, the apparatus 900 is embodied in a console, the master controllers are remote controllers, and the sub-controllers are also remote controllers. Different types of central controllers (e.g., game controllers) running different real time applications may use apparatus 900 to facilitate piconet data aggregation to mitigate issues associated with input latency.

Figure 10:
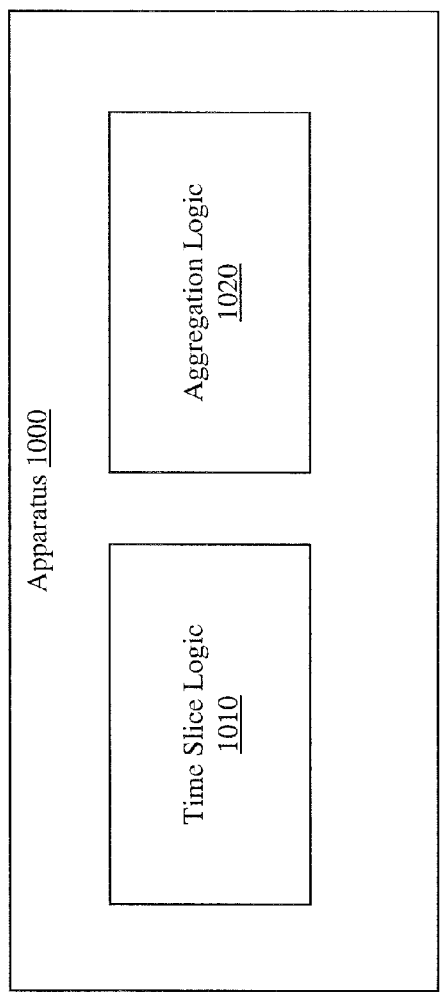
FIG. 10 illustrates an apparatus 1000 associated with multi-level piconet data aggregation.

FIG. 10 illustrates an apparatus 1000 associated with multi-level piconet data aggregation. Apparatus 1000 includes time slice logic 1010 and aggregation logic 1020.

Time slice logic 1010 identifies an opportunity to transmit master controller data as part of a time division multiplexing scheme that is controlling communication in a two-level piconet hierarchy. The two-level piconet hierarchy may include a top level piconet and one or more lower level piconets like the scatternets illustrated in FIGS. 1-3. The top level piconet may include a controller like apparatus 900 (FIG. 9). The apparatus 1000 operates in a master controller. The controller is configured as a master device in the top level piconet and the master controllers are configured as slave devices in the top level piconet. A lower level piconet in the two-level hierarchy includes a master controller and a sub-controller(s). In different examples there may be from one to seven sub-controllers in a lower level piconet. The master controller in a lower level piconet operates as a master in the lower level piconet and the sub-controller(s) operate as slave devices in the lower level piconet. While a two level hierarchy is described, one skilled in the art will appreciate from teachings herein that other depth hierarchies may be established and processed similarly.

Aggregation logic 1020 produces master controller data that is an aggregation of data from the sub-controller(s) in a lower-level piconet that includes the apparatus 1000 and data from the apparatus 1000.

In one example, apparatus 1000 is embodied in a remote controller configured to communicate with a console. The remote controller may communicate with the console using Bluetooth wireless communications.

In one embodiment, apparatus 900 can be combined with a plurality of apparatuses 1000 to create a system that provides acceptable input latency for a greater number of remote controllers than conventionally possible.

In different embodiments, logic or other components described herein may be implemented with, but not limited to, hardware, firmware stored in memory, executable instructions stored in a memory or logic device, and/or combinations thereof. In some embodiments, the apparatus 900 and/or the apparatus 1000 may include a software controlled microprocessor, a discrete logic (e.g., application specific integrated circuit (ASIC), an analog circuit, a digital circuit, a programmed logic device, a memory device containing instructions, and so on. Logic may include one or more gates, combinations of gates, or other circuit components.

Figure 11:
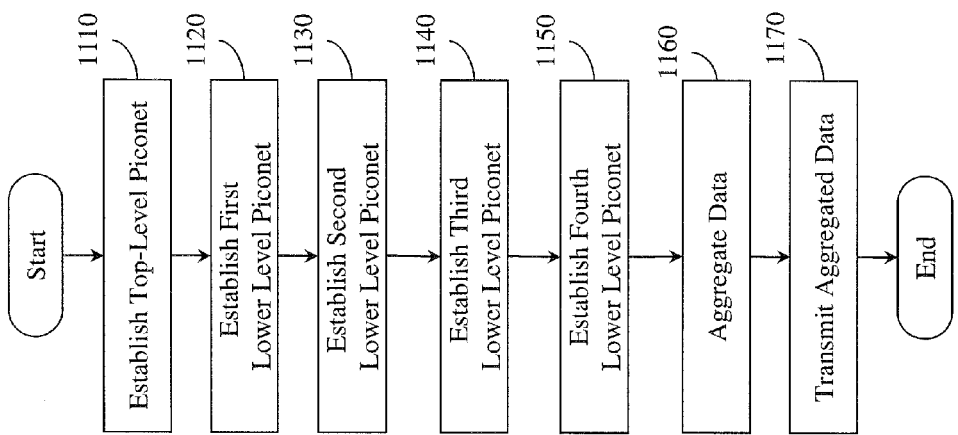
FIG. 11 illustrates a method 1100 associated with multi-level piconet data aggregation.

FIG. 11 illustrates a method 1100 associated with piconet data aggregation. At 1110, method 1100 includes establishing a top-level piconet that includes a controller and a plurality of master controllers. The plurality of master controllers communicate with the console during a time period controlled by a controller-driven time division multiplexing plan. The controller acts as a master device in the top-level piconet and the master controllers act as slave devices in the top-level piconet. Examples of top level piconets and lower level piconets are illustrated in FIGS. 1-3.

At 1120, a first piconet is established. The first piconet includes a master controller and a sub-controller(s) configured to communicate with the master controller. The master controller acts as a master device in the first piconet and the sub-controller(s) act as slave devices in the first piconet. Additional piconets may be established at 1130, 1140, and 1150. While establishing additional piconets is illustrated at 1130, 1140, and 1150, one skilled in the art will appreciate from the teachings herein that piconet data aggregation can occur with just one top level piconet and one lower level piconet.

At 1160, aggregate data is produced. The aggregate data includes data from the sub-controller(s) in a piconet and data from the master controller in the same piconet as the sub-controller(s).

At 1170, the aggregate data is transmitted to the controller during a time period when the controller is communicating with the master controller.

Arranging the lower level piconets at 1120 through 1150, aggregating the data at 1160, and then transmitting aggregate data at 1170 facilitates producing a time division multiplexing plan that satisfies an input latency threshold for members of the top-level piconet and for members of the lower level piconets.

In one example, the time division multiplexing plan is designed to cycle through all members of the top level piconet in 5 ms or less. In this example, the number of opportunities to communicate with master controllers in the top level piconet per time period equals the number of master controllers in the top-level piconet. In this example, a lower level piconet may be limited to having two sub-controllers or less.

In another example, the time division multiplexing plan is designed to cycle through all members of the top level piconet in 6.25 ms or less. In this example, the number of opportunities to communicate with master controllers in the top level piconet per time period equals one more than the number of master controllers in the top-level piconet. In this example, a lower level piconet may be limited to having three sub-controllers or less.

In another example, the time division multiplexing plan is designed to cycle through all members of the top level piconet in 10 ms or less. In this example, the number of opportunities to communicate with master controllers in the top level piconet per time period equals one more than the largest number of sub-controllers in any of the lower level piconets. In this example, a lower level piconet may be limited to having seven sub-controllers or less.

While example systems and methods have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An apparatus, comprising:
 piconet logic configured to establish a multi-level piconet hierarchy, the multi-level piconet hierarchy comprising a top level piconet and one or more lower level piconets,
   wherein the top level piconet includes the apparatus and one or more master controllers, the apparatus being configured as a master device in the top level piconet, and the one or more master controllers being configured as slave devices in the top level piconet, and
   wherein a lower level piconet includes a master controller and one or more sub-controllers, the master controller being configured as a master in the lower level piconet, and the one or more sub-controllers being configured as slave devices in the lower level piconet;
 time division multiplexing logic configured to solicit and control aggregated communication with the one or more master controllers in the top-level piconet, wherein the aggregated communication comprises an aggregation of (i) data from the master controller in the piconet and (ii) data from one or more sub-controllers in the piconet; and de-aggregation logic configured to receive the aggregated communication and separate the data associated with the master controller in the piconet from the data associated with the one or more sub-controllers in the piconet.

2. The apparatus of claim 1, wherein the one or more lower level piconets comprise four piconets.

3. The apparatus of claim 2, wherein a member of the one or more lower level piconets comprises two sub-controllers, and wherein the time division multiplexing logic is configured to acquire data from the four piconets using a four slice, 5 ms time division multiplexing scheme.

4. The apparatus of claim 2, wherein a member of the one or more lower level piconets comprises three sub-controllers, and wherein the time division multiplexing logic is configured to acquire data from the four piconets using a five slice, 6.25 ms time division multiplexing scheme, wherein one of the five slices does not address any of the members of the top-level piconet.

5. The apparatus of claim 1, wherein the time division multiplexing logic is configured to acquire data from the lower level piconets using a time division multiplexing scheme that has a number of slices equal to one more than the number of sub-controllers in the lower level piconet having the most sub-controllers.

6. The apparatus of claim 1, the apparatus being embodied in a gaming console, wherein the master controllers are remote controllers, and wherein the sub-controllers are remote controllers.

7. The apparatus of claim 6, comprising Bluetooth communication logic configured to communicate with remote controllers.

8. An apparatus, comprising:

time slice logic configured to identify an opportunity to transmit master controller data as part of a time division multiplexing scheme, the time division multiplexing scheme controlling communication in a multi-level piconet hierarchy, the multi-level piconet hierarchy comprising a top level piconet and one or more lower level piconets, wherein the top level piconet includes a console and one or more master controllers, the apparatus being one of the one or more master controllers, the console being configured as a master device in the top level piconet, and the one or more master controllers being configured as slave devices in the top level piconet, and wherein a lower level piconet includes a master controller and one or more sub-controllers, the master controller in a lower level piconet being configured as a master in the lower level piconet, and the one or more sub-controllers being configured as slave devices in the lower level piconet; and aggregation logic configured to produce the master controller data, wherein the master controller data comprises an aggregation of (i) data from one or more sub-controllers configured in a lower-level piconet that includes the apparatus and (ii) data from the apparatus.

9. The apparatus of claim 8, wherein the time division multiplexing scheme is configured to acquire data from the lower level piconets using a time division multiplexing plan that has a number of slices equal to one more than the largest number of sub-controllers in the lower level piconet.

10. The apparatus of claim 8, the apparatus being embodied in a remote controller configured to communicate using Bluetooth.

11. A system, comprising:

a first apparatus comprising:

piconet logic configured to establish a two-level piconet hierarchy, the two-level piconet hierarchy comprising a top level piconet and one or more lower level piconets, wherein the top level piconet includes the first apparatus and one or more master controllers, the apparatus being configured as a master device in the top level piconet, and the one or more master controllers being configured as slave devices in the top level piconet, and wherein a lower level piconet includes a master controller and one or more sub-controllers, the master controller being configured as a master in the lower level piconet, and the one or more sub-controllers being configured as slave devices in the lower level piconet;

time division multiplexing logic configured to control aggregated communication with the one or more master controllers in the top-level piconet according to a time division multiplexing scheme, wherein the aggregated communication comprises an aggregation of (i) data from the master controller and (ii) data from one or more sub-controllers; and de-aggregation logic configured to receive the aggregated communication and separate the data associated with the master controller from the data associated with the one or more sub-controllers, and a plurality of second apparatuses, a second apparatus being configured as a master controller, and a second apparatus comprising:

time slice logic configured to identify an opportunity to transmit outbound data as controlled by the time division multiplexing scheme; and aggregation logic configured to produce the outbound data, wherein the outbound data comprises an aggregation of (i) data from one or more sub-controllers configured in a lower-level piconet that includes the second apparatus and (i) data from the second apparatus.

12. A method, comprising:

establishing a top-level piconet comprising a console and a plurality of master controllers, the plurality of master controllers being configured to communicate with the console during a time period controlled by a console-driven time division multiplexing plan, the console being configured as a master device in the top-level piconet, and the plurality of master controllers being configured as a slave device in the top-level piconet;

establishing a first piconet, the first piconet comprising (i) a master controller and (ii) one or more sub-controllers configured to communicate with the master controller, the master controller being configured as a master device in the first piconet, and the one or more sub-controllers being configured as slave devices in the first piconet;

controlling the master controller to produce an aggregate data comprising data from the one or more sub-controllers and data from the master controller; and controlling the master controller to transmit the aggregate data to the console during the time period, wherein the time division multiplexing plan is configured so that the console satisfies an input latency threshold for members of the top-level piconet and members of the first piconet, and wherein the time division multiplexing plan provides one opportunity to transmit per master controller in the top-level piconet per time period.

13. The method of claim 12, comprising:
establishing a second piconet, the second piconet comprising (i) a second master controller and (ii) one or more second sub-controllers configured to communicate with the second master controller, the second master controller being one of the plurality of master controllers, the second master controller being configured as a slave device in the top-level piconet, the second master controller being configured as a master device in the second piconet, and the one or more second sub-controllers being configured as slave devices in the second piconet;
controlling the second master controller to produce a second aggregate data, the second aggregate data comprising (i) data from the one or more second sub-controllers and (ii) data from the second master controller; and
controlling the second master controller to transmit the second aggregate data to the console during the time period, wherein the time division multiplexing plan is configured so that the console satisfies an input latency threshold for members of the first piconet, members of the second piconet, and members of the top-level piconet.

14. The method of claim 13, comprising:
establishing a third piconet, the third piconet comprising (i) a third master controller and (ii) one or more third sub-controllers configured to communicate with the third master controller, the third master controller being one of the plurality of master controllers, the third master controller being configured as a slave device in the top-level piconet, the third master controller being configured as a master device in the third piconet, and the one or more third sub-controllers being configured as slave devices in the third piconet;
controlling the third master controller to produce a third aggregate data, the third aggregate data comprising (i) data from the one or more third sub-controllers and (ii) data from the third master controller; and
controlling the third master controller to transmit the third aggregate data to the console during the time period, wherein the time division multiplexing plan is configured so that the console satisfies an input latency threshold for members of the first piconet, members of the second piconet, members of the third piconet, and members of the top-level piconet.

15. The method of claim 14, comprising:
establishing a fourth piconet, the fourth piconet comprising (i) a fourth master controller and (ii) one or more fourth sub-controllers configured to communicate with the fourth master controller, the fourth master controller being one of the plurality of master controllers, the fourth master controller being configured as a slave device in the top-level piconet, the fourth master controller being configured as a master device in the fourth piconet, and the one or more fourth sub-controllers being configured as slave devices in the fourth piconet;
controlling the fourth master controller to produce a fourth aggregate data, the fourth aggregate data comprising (i) data from the one or more fourth sub-controllers and (ii) data from the fourth master controller; and
controlling the fourth master controller to transmit the fourth aggregate data to the console during the time period, wherein the time division multiplexing plan is configured, at least in part, so that the console satisfies an input latency threshold for members of the first piconet, members of the second piconet, members of the third piconet, members of the fourth piconet, and members of the top-level piconet.

16. The method of claim 12, wherein the console is a Bluetooth device and wherein the master controller is a Bluetooth device.

17. The method of claim 12, wherein the console is a gaming console and wherein the master controller is a remote controller.

18. The method of claim 15, wherein the time period is 5 ms or less and wherein the number of opportunities per time period equals the number of master controllers in the top-level piconet.

19. The method of claim 15, wherein the time period is 6.25 ms or less, wherein the number of opportunities per time period is one more than the number of master controllers in the top-level piconet, and wherein the maximum number of sub-controllers in any of the first piconet, the second piconet, the third piconet, and the fourth piconet is three.

20. The method of claim 15, wherein the time period is 10 ms or less, wherein the number of opportunities per time period is one more than largest number of sub-controllers in any of the first piconet, the second piconet, the third piconet, and the fourth piconet, and wherein the maximum number of sub-controllers in any of the first piconet, the second piconet, the third piconet, and the fourth piconet is seven.

* * * * *